United States Patent
Stenerson et al.

(10) Patent No.: US 7,200,189 B1
(45) Date of Patent: Apr. 3, 2007

(54) METHOD AND SYSTEM FOR PROVIDING ADAPTIVE TIMING RECOVERY FOR LOW POWER APPLICATION

(75) Inventors: Roger Stenerson, Sunnyvale, CA (US); WeiMin Zhang, San Jose, CA (US)

(73) Assignee: BroadLogic Network Technologies, Inc., San Jose, CA (US)

( * ) Notice: Subject to any disclaimer, the term of this patent is extended or adjusted under 35 U.S.C. 154(b) by 909 days.

(21) Appl. No.: 10/269,795

(22) Filed: Oct. 11, 2002

Related U.S. Application Data

(60) Provisional application No. 60/329,245, filed on Oct. 11, 2001.

(51) Int. Cl.
*H03D 3/18* (2006.01)
*H03D 3/24* (2006.01)

(52) U.S. Cl. ............... 375/327; 375/371; 375/373; 327/158; 327/291; 329/304

(58) Field of Classification Search ........... 375/327, 375/371, 373; 327/158, 373; 329/304
See application file for complete search history.

(56) References Cited

U.S. PATENT DOCUMENTS

| | | | | |
|---|---|---|---|---|
| 4,872,155 A | * | 10/1989 | Yokogawa et al. | 369/47.28 |
| 5,334,952 A | * | 8/1994 | Maddy et al. | 331/1 A |
| 6,275,554 B1 | * | 8/2001 | Bouillet et al. | 375/371 |
| 6,452,431 B1 | * | 9/2002 | Waldrop | 327/158 |
| 7,016,613 B2 | * | 3/2006 | Savoj | 398/155 |

OTHER PUBLICATIONS

Kaenel et al, "A 320 MHZ, 1.5 mW@ 1.35 V CMOS PLL for Microprocessor Clock Generation", IEEE Journal of Solid State Circuits, Nov. 1996, vol. 31, No. 11, p. 1715-1722.*

* cited by examiner

*Primary Examiner*—Chieh M. Fan
*Assistant Examiner*—Ted M. Wang
(74) *Attorney, Agent, or Firm*—Townsend and Townsend and Crew LLP

(57) ABSTRACT

A system for providing adaptive timing recovery is provided. In an exemplary embodiment, the system includes a fractional resampler, an error function module and a loop filter, arranged collectively to form a timing recovery loop. In an initial mode, the error function module compares the output of the fractional resampler with a reference signal to determine an error, if any. An error signal is generated accordingly based on the error. The error signal is then provided to the loop filter allowing the loop filter to generate a correction signal. The correction signal is provided to the fractional resampler to allow the fractional resampler to generate an output which minimizes the error. When the error function module determines that the error is within an acceptable range, i.e., a timing lock is achieved, the system goes into a steady mode. In the steady mode, the error function module is directed to execute at a slower rate. By executing at a slower rate, the error function module is able to operate at a reduced level of power consumption.

23 Claims, 1 Drawing Sheet

METHOD AND SYSTEM FOR PROVIDING ADAPTIVE TIMING RECOVERY FOR LOW POWER APPLICATION

CROSS-REFERENCES TO RELATED APPLICATION

The present application claims the benefit of priority under 35 U.S.C. § 119 from U.S. Provisional Patent Application Ser. No. 60/329,245, filed Oct. 11, 2001, entitled "ADAPTIVE TIMING RECOVERY FOR LOW POWER APPLICATIONS", by Stenerson et al., the disclosure of which is hereby incorporated by reference in its entirety for all purposes as if set forth in full herein.

BACKGROUND OF THE INVENTION

The present invention generally relates to adaptive timing recovery, and more specifically, to a method and system for providing improved adaptive timing recovery for low power applications.

Adaptive timing recovery has been in use for years in electronic equipment. In a conventional piece of electronic equipment that utilizes adaptive timing recovery, adaptive timing recovery is typically accomplished using a full rate timing error generation function and a loop filter.

Conventional adaptive timing recovery suffers from a number of problems. For example, conventional implementation of adaptive timing recovery generally requires significant power consumption. The myriad types of problems associated with high level of power consumption in electronic devices are well known. In addition, conventional circuitry used to implement adaptive timing recovery does not scale well when multiple timing recovery loops are used on one chip for multiple channels. Furthermore, such circuitry is unable to adapt the update rate based on timing loop lock status.

Hence, it would be desirable to have a method and system that is capable of providing adaptive timing recovery at a reduced the level of power consumption.

SUMMARY OF THE INVENTION

A method and system for providing adaptive timing recovery is provided. According to an exemplary embodiment of the present invention, the system includes a fractional resampler, an error function module and a loop filter, arranged collectively to form a timing recovery loop.

The fractional resampler receives a data signal and generates a sampled output by sampling the data signal. In additional, the fractional resampler also generates a clock enable signal which accompanies the sampled output. The clock enable signal is used to drive the error function module. In an initial or acquisition mode, the error function module compares the sampled output of the fractional resampler with a reference signal to determine whether there is any error. An error signal is generated accordingly based on the error. The error signal is then provided to the loop filter allowing the loop filter to generate a correction signal. The correction signal is provided to the fractional resampler to allow the fractional resampler to generate an update sampled output which minimizes the error. When the error function module determines that the error is within an acceptable range, i.e., a timing lock is achieved, the system goes into a steady or tracking mode.

In the steady mode, the error function module is directed to execute at a slower rate. In one exemplary embodiment, the lower execution rate of the error function module is achieved by decimating or reducing the rate of the clock enable signal generated by the fractional resampler. Since the error function module is driven by the clock enable signal, reducing the rate of the clock enable signal also reduces the execution rate of the error function module. By executing at a slower rate, the error function module is able to operate at a reduced level of power consumption.

In an exemplary application, the present invention can be deployed to reduce power consumption of the timing recovery loop used in a digital demodulator.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
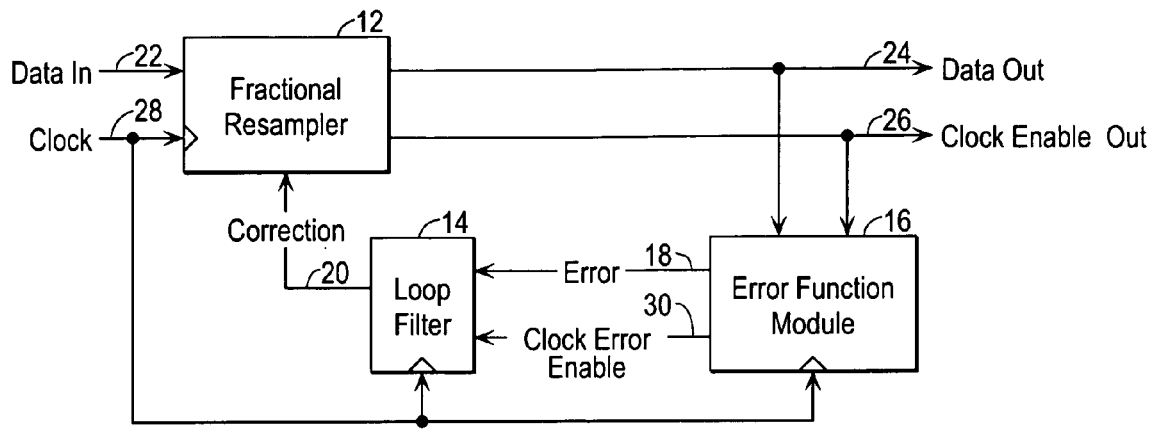
FIG. 1 is a simplified block diagram illustrating an exemplary embodiment of the present invention.

The present invention in the form of one or more exemplary embodiments will now be described. FIG. 1 is a simplified block diagram illustrating an exemplary embodiment of the present invention. Referring to FIG. 1, there is shown a system 10 that is capable of providing adaptive timing recovery in accordance with the present invention. The system 10 includes a fractional resampler 12, a loop filter 14 and an error function module 16. The fractional resampler 12, the loop filter 14 and the error function module 16 are arranged in a servo feedback configuration to form a timing recovery loop. A data signal 22 is provided to the fractional resampler 12. The fractional resampler 12 samples the data signal 22 and generates a sampled output 24. The sampled output 24 from the fractional resampler 12 is fed to the error function module 16. Output in the form of an error signal 18 from the error function module 16, in turn, is fed to the loop filter 14. The loop filter 14 then provides its output in the form of a correction signal 20 back to the fractional resampler 12.

In operation, the error function module 16 computes the error signal 18 based on the sampled output 24 from the fractional resampler 12. The loop filter 14 filters the error signal 18 and generates the correction signal 20. The correction signal 20 from the loop filter 14 is then used by the fractional resampler 12 to adjust its sampling of the data signal 22 such that the data signal 22 is sampled at the correct frequency and phase thereby achieving a timing lock. The exemplary operations of the system 10 as shown in FIG. 1 will be further described below.

Figure 2:
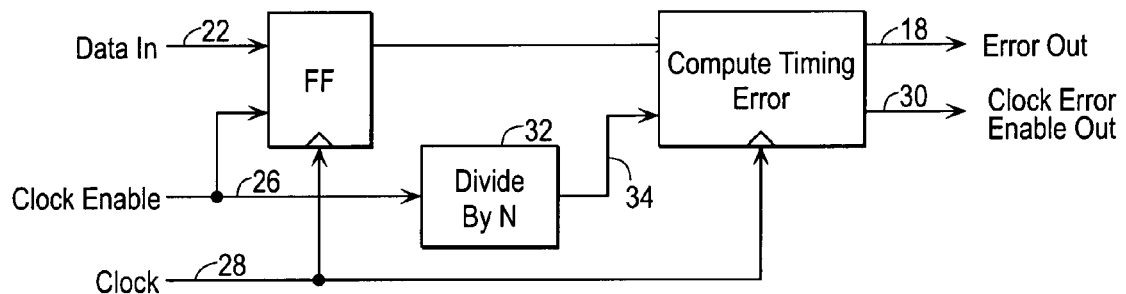
FIG. 2 is a simplified block diagram illustrating an exemplary embodiment of an error function module in accordance with the present invention.

The error function module 16 computes the error signal 18 based on the sampled output 24 received from the fractional resampler 12. More specifically, the error signal 18 represents a phase error between the sampled output 24 and a reference signal (not shown). That is, the error function module 16 compares the respective phases of the sampled output 24 and the reference signal to determine the phase differential, if any. The phase error is then generated accordingly based on the phase differential. The phase error is next provided to and used by the loop filter 14 to direct the fractional resampler 12 to adjust the sampled output 24 such that the phase differential between the sampled output 24 and the reference signal is minimized. When the phase differential falls within an acceptable range, the fractional resampler 12 is said to have acquired a timing lock on the sampled output 24 with respect to the reference signal. The acceptable range for the phase differential may vary depending on specific design and system requirements and/or constraints. A person of ordinary skill in the art will know how to determine the acceptable range for the phase differential for different applications. Once the timing lock is attained, the error function module 16 can be directed to execute a slower rate, such as, ½, ¼ or ⅛. By executing the error function module 16 at a slower rate, power consumption can be reduced. FIG. 2 illustrates an exemplary embodiment of the error function module 16 in accordance with the present invention.

The loop filter 14 filters the error signal 18 and generates the correction signal 20. In one implementation, the loop filter 14 filters the error signal 18 by using a low-pass filter. The correction signal 20 is then used by the fractional resampler 12 to adjust the sampling of the data signal 22 such that the phase differential between the sampled output 24 and the reference signal falls in the acceptance range. In other words, the correction signal 20 is used to bring the fractional sampler 12 into a timing lock with respect to the reference signal.

Figure 3:
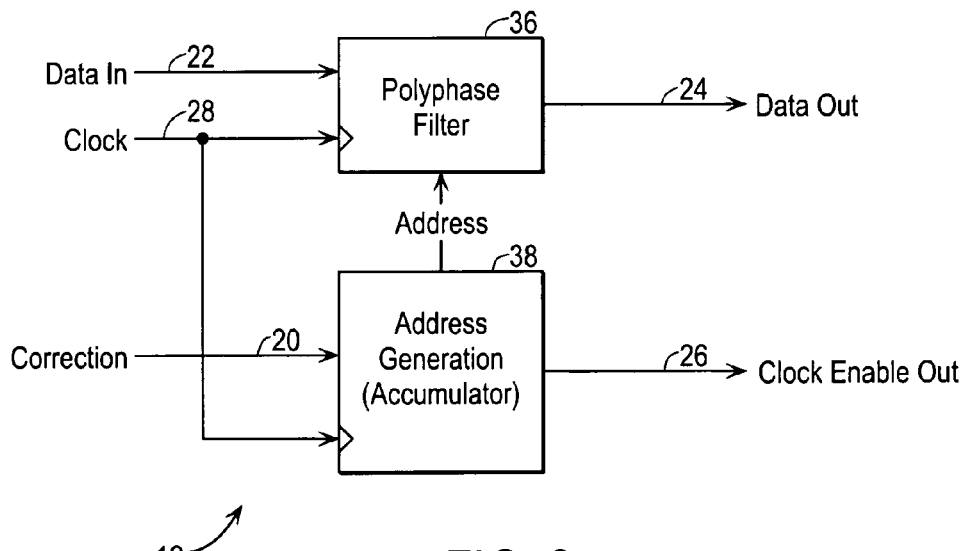
FIG. 3 is a simplified block diagram illustrating an exemplary embodiment of a fractional resampler in accordance with the present invention.

The fractional resampler 12 uses the correction signal 20 received from the loop filter 14 to adjust sampling of the data signal 22 such that the data signal 22 is sampled at the correct frequency and phase thereby allowing a timing lock to be acquired. For example, the correction signal 20 can be an upsample value, where the downsample value of the fractional resampler 12 is fixed; alternatively, where the upsample value of the fractional resampler 12 is fixed, the correction signal 20 can specify a downsample value. The sampled output 24, which is derived from resampling the data signal 22, and a clock enable output 26 are provided by the fractional resampler 12 to subsequent signal processing blocks, including the error function module 16, for other purposes. Alternatively, instead of generating the clock enable output 26, the fractional resampler 12 can generate an interrupted clock. FIG. 3 is a simplified block diagram illustrating an exemplary embodiment of the fractional resampler 12 according to the present invention. In this exemplary embodiment, the fractional resampler 12 includes a polyphase filter 36 and an address generation module 38. The address generation module 38 is configured to generate an address using the correction signal 20 received from the loop filter 14. The address generated by the address generation module 38 is then used by the polyphase filter 36 to generate the sampled output 24. Based on the disclosure and teachings provided herein, a person of ordinary skill in the art will know of other ways and/or method to implement the fractional resampler 12 for use in connection with the present invention.

The sampled output 24 is produced by the fractional resampler 12 by sampling the data signal 22 at a predetermined sampling rate. The clock signal 28 transitions whenever there is a valid data signal 22 for sampling. Initially, the sampled output 24 produced by the fractional resampler 12 is usually not locked to the reference signal. This typically occurs during system initialization. As mentioned above, the error function module 16 compares the sampled output 24 and the reference signal, on an iterative basis if necessary, to allow the fractional resampler 12 to attain a timing lock. To attain the timing lock means the phase and frequency of the sampled output 24 are respectively within acceptable range of those of the reference signal. The process of attaining the timing lock by the system 10 can be referred to as the initial or acquisition mode. The clock enable signal 26 is active whenever there is a valid sample on the sampled output 24. The clock error enable signal 30 is active whenever there is a valid error signal 18. When active, the clock error enable signal 30 allows the loop filter 14 to filter the valid error signal 18 and generate the correction signal 20.

Iterative generations of the error signal 18 allow the timing recovery loop to acquire the timing lock in a prompt manner. Once the timing lock is acquired, the error function module 16 is directed to execute at a slower rate thereby reducing power consumption. When the error function module 16 is directed to execute at a slower rate, the system 10 can be described as being in a steady or tracking mode. In one exemplary embodiment, in order to direct the error function module 16 to execute at a slower rate, the clock enable signal 26 accompanying the sampled output 24 is decimated or reduced to a lower operating rate. In an exemplary implementation, the error function module 16 and the loop filter 14 are implemented using CMOS circuitry. By reducing the clock enable signal 26, the switching rate of the CMOS circuitry in the error function module 16 and the loop filter 14 is accordingly lowered. The lowering of the switching rate in turn leads to a reduction of power consumption. It should be understood by a person of ordinary skill in the art that other types of circuitry may also be used to implement the error function module 16 and the loop filter 14 and that, likewise, a reduction of power consumption can also be achieved.

As noted above, the error function module 16 produces the error signal 18 based on the sampled output 24 received from the fractional resampler 12. In an exemplary implementation, the error signal 18 causes the fractional resampler 12 to resample the data signal 22 to produce the sampled output 24 which is frequency- and phase-locked to a rate of two samples per symbol. Once the timing lock has been attained, the rate at which the error signal computation is done is reduced by a factor N. In an exemplary embodiment as shown in FIG. 2, the reduction in the error signal computation rate is achieved by using a divider 32 to produce a decimated clock enable signal 34. The factor N can assume one of many values including, for example, two (2), four (4), eight (8) etc. A person of ordinary skill in the art will know how to appropriately select the factor N depending on design considerations and/or system requirements, etc. A reduction of the execution rate of the error function module 16 accordingly reduces power consumption.

In an alternative exemplary embodiment, the reduction in the error signal computation rate can be achieved by the fractional resampler 12. Based on the correction signal 20 received from the loop filter 14, the fractional resampler 12 is able to determine whether the timing lock has been achieved. Once it is determined that the timing lock has been achieved, the fractional resampler 12 can accordingly adjust the clock enable signal 26 thereby reducing the execution rate of the error function module 16.

When the error function module 16 operates at a reduced rate, the clock error enable signal 30 is also accordingly reduced to a lower rate. Since the loop filter 14 is driven by the clock error enable signal 30, the loop filter 14 is caused to execute at a lower rate as well. Likewise, the reduction in the execution rate of the loop filter also accordingly reduces power consumption.

In effect, by reducing the execution rate of the error function module 16, the system 10 checks on the accuracy of the timing lock on a less frequent basis. In other words, more data from the sampled output 24 is generated before the error function module 16 is invoked to perform its functions. This takes advantage of the fact that once the timing lock is achieved, usually minor adjustment is needed to maintain its accuracy.

It should be understood that the present invention as described herein can be implemented using software, hardware or a combination of both. Based on the disclosure and teachings provided herein, a person of ordinary skill in the art will be know of other ways/methods to implement the present invention.

The present invention can be deployed and/or applied in a various types of applications. For example, in an exemplary application, the present invention can be deployed to reduce power consumption of the timing recovery loop used in connection with a digital demodulator. A person of ordinary skill in the art will know of other ways and/or methods to apply the present invention.

Furthermore, based on the disclosure and teachings provided herein, it will appreciated by a person of ordinary skill in the art that the present invention results in a number of advantages and benefits. For example, as mentioned above, the present invention results in reduction of power consumption. That is, less computational resources are used to achieve and maintain a timing lock on a data signal. Conversely, the same amount of computational resources that would have been needed under conventional systems for providing timing recovery is now available to accommodate and handle additional timing recovery processing. For instance, as mentioned above, the present invention can be deployed in connection with a digital demodulator. Using the present invention, additional digital demodulators can be accommodated by the same amount of computational resources. Based on the disclosure and teachings provided herein, a person of ordinary skill in the art will realize other advantages and benefits provided by the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A circuit for providing adaptive timing recovery, comprising:
    a resampler configured to sample a data signal to generate a sampled output and a clock enable signal accompanying the sampled output; and
    an error function module configured to generate an error signal based on a comparison between the sampled output and a reference signal and operate at one of a plurality of execution rates that are established by the clock enabled signal;
    wherein:
        the error signal is used by the resampler to adjust its sampling of the data signal to minimize the error;
        before the error is minimized to achieve a timing lock, the clock enable signal is used to drive the error function module to operate at a first execution rate;
        when the error is minimized to achieve the timing lock, the clock enable signal is decimated, and the clock enable signal, so decimated, is used to drive the error function module to operate at a second execution rate.

2. The circuit of claim 1 further comprising:
    a loop filter configured to filter the error signal to generate a correction signal;
    wherein the correction signal directs the resampler to adjust its sampling of the data signal.

3. The circuit of claim 1 wherein the second execution rate is lower than the first execution rate.

4. The circuit of claim 1 wherein the error function module and the loop filter are implemented using CMOS circuitry.

5. The circuit of claim 1 further comprising:
    a loop filter configured to filter the error signal to generate a correction signal;
    wherein:
        the correction signal directs the resampler to adjust its sampling of the data signal;
        the error function module is further configured to generate a clock error enable signal;
        the clock error enable signal is used to drive the loop filter; and
        the clock error enable signal is dependent on the current execution rate of the error function module.

6. A digital demodulator incorporating the circuit as recited in claim 1.

7. A circuit for providing adaptive timing recovery, the circuit being capable of operating in an initial mode or a steady mode, the circuit comprising:
    a resampler configured to sample a data signal to generate a sampled output and a clock enable signal accompanying the sampled output; and
    an error function module configured to generate an error signal based on a comparison between the sampled output and a reference signal;
    wherein:
        the error signal is used by the resampler to adjust its sampling of the data signal to achieve a timing lock;
        before the timing lock is achieved, the error function module is directed to operate in the initial mode and the clock enable signal is used to drive the error function module to operate at a first execution rate;
        when the timing lock is achieved, the clock enable signal is decimated to derive a second execution rate, the error function module is directed to operate in the steady mode, and the clock enable signal, so decimated is used to drive the error function module to operate at the second execution rate.

8. The circuit of claim 7 further comprising:
    a loop filter configured to filter the error signal to generate a correction signal;
    wherein the correction signal directs the resampler to adjust its sampling of the data signal.

9. The circuit of claim 8 wherein the error function module and the loop filter are implemented using CMOS circuitry.

10. The circuit of claim 7 further comprising:
    a loop filter configured to filter the error signal to generate a correction signal;

wherein:
the correction signal directs the resampler to adjust its sampling of the data signal;
the error function module is further configured to generate a clock error enable signal;
the clock error enable signal is used to drive the loop filter; and
the clock error enable signal is dependent on the current execution rate of the error function module.

11. A digital demodulator incorporating the circuit as recited in claim 7.

12. A digital demodulator having circuitry for providing adaptive timing recovery, comprising:
a resampler configured to sample a data signal to generate a sampled output and a clock enable signal;
an error function module configured to (1) generate an error signal based on a comparison between the sampled output and a reference signal, (2) generate a clock error enable signal, and (3) operate at one of a plurality of execution rates; and
a loop filter, driven by the clock error enable signal, and configured to filter the error signal and generate a correction signal, the correction signal being used to direct the resampler to adjust its sampling of the data signal to achieve a timing lock;
wherein:
before the timing lock is achieved, the error function module is directed to operate at a first execution rate driven by the clock enable signal;
when the timing lock is achieved, the error function module is directed to operate at a second execution rate driven by a reduced version of the clock enable signal; and
the clock error enable signal is dependent on the current execution rate of the error function module.

13. The digital demodulator of claim 12 wherein the error function module and the loop filter are implemented using CMOS circuitry.

14. A digital demodulator having circuitry for providing adaptive timing recovery, the digital demodulator being capable of operating in an initial mode or a steady mode, comprising:
a resampler configured to sample a data signal to generate a sampled output;
an error function module configured to generate an error signal based on a comparison between the sampled output and a reference signal and further configured to generate a clock error enable signal; and
a loop filter, driven by the clock error enable signal, and configured to filter the error signal to generate a correction signal;
wherein:
the correction signal is used to direct the resampler to adjust its sampling of the data signal to achieve a timing lock;
before the timing lock is achieved, the error function module is directed to operate in the initial mode at a first execution rate; and
when the timing lock is achieved, the clock enable signal is decimated to derive a second execution rate, and the error function module is directed to operate in the steady mode at the second execution rate; and
the clock error enable signal is dependent on the current execution rate of the error function module.

15. The digital demodulator of claim 14 wherein:
the resampler is further configured to generate a clock enable signal;
in the initial mode, the first execution rate is driven by the clock enable signal; and
in the steady mode, the second execution rate is driven by a reduced version of the clock enable signal.

16. The digital demodulator of claim 14 wherein the error function module and the loop filter are implemented using CMOS circuitry.

17. A method for implementing adaptive timing recovery, comprising:
sampling a data signal to generate a sampled output and a clock enable signal accompanying the sampled output;
comparing the sampled output and a reference signal to generate a comparison signal and determine whether a timing lock between the sampled output and the reference signal has been attained, the comparison being performed at a first execution rate that is established by the clock enable signal;
if it has been determined that the timing lock has not been attained, adjusting the sampling of the data signal based on the comparison signal and repeating the comparing step; and
if it has been determined that the timing lock has been attained, decimating the clock enable signal, maintaining the sampling of the data signal and comparing the sampled output and the reference signal, the comparison being performed at a second execution rate that is established by the clock enable signal, so decimated.

18. A digital demodulator executing the method as recited in claim 17.

19. The method of claim 17 wherein the method is implemented using software, hardware or a combination of both.

20. The method of implementing adaptive timing recovery, comprising:
performing the following in an initial mode:
sampling a data signal at a sampling rate to generate a sampled output and a clock enable signal accompanying the sampled output;
comparing the sampled output and a reference signal to generate a comparison result, the comparison being performed at a first execution rate that is established by the clock enable signal;
evaluating the comparison result to determine whether a timing lock has been achieved;
if it has been determined that the timing lock has not been achieved, adjusting the sampling rate and repeating the sampling and the comparing steps; and
if it has been determined that the timing lock has been achieved, entering into a steady mode; and
performing the following in the steady mode:
decimating the clock enable signal;
sampling the data signal at the sampling rate under which the timing lock is achieved; and
comparing the sampled output and the reference signal, the comparison being performed at a second execution rate that is established by the clock enable signal, so decimated.

21. The method of claim 20 wherein the second execution rate is lower than the first execution rate.

22. A digital demodulator executing the method as recited in claim 20.

23. The method of claim 20 wherein the method is implemented using software, hardware or a combination of both.

* * * * *